United States Patent
Cox, III

(10) Patent No.: US 11,235,630 B1
(45) Date of Patent: Feb. 1, 2022

(54) HARNESS ASSEMBLY FOR TOWING A VEHICLE

(71) Applicant: Sam Cox, III, West Point, MS (US)

(72) Inventor: Sam Cox, III, West Point, MS (US)

(*) Notice: Subject to any disclaimer, the term of this patent is extended or adjusted under 35 U.S.C. 154(b) by 0 days.

(21) Appl. No.: 17/465,983

(22) Filed: Sep. 3, 2021

(51) Int. Cl.
B60D 1/18 (2006.01)

(52) U.S. Cl.
CPC .............. *B60D 1/187* (2013.01); *B60D 1/18* (2013.01); *B60D 1/182* (2013.01); *B60D 1/185* (2013.01)

(58) Field of Classification Search
CPC .......... B60D 1/18; B60D 1/182; B60D 1/185; B60D 1/187
See application file for complete search history.

(56) References Cited

U.S. PATENT DOCUMENTS

| | | |
|---|---|---|
| 1,531,180 A | 3/1925 | Erickson |
| 2,550,218 A | 4/1951 | Brady |
| 2,913,131 A | 11/1959 | Holmes |
| 3,504,811 A | 4/1970 | Wegener et al. |
| 4,997,229 A | 3/1991 | Swanson |
| 5,308,101 A | 5/1994 | Monty |
| 6,050,587 A * | 4/2000 | Panhausen ............... B60D 1/18 280/480 |
| 7,845,669 B2 * | 12/2010 | Yeh ........................ B60D 1/182 280/457 |
| 9,849,740 B2 * | 12/2017 | Sparkes ................. B60D 1/187 |
| 2016/0297265 A1 * | 10/2016 | Sparkes ................. B60D 1/182 |
| 2017/0268190 A1 * | 9/2017 | Moore ...................... E01H 5/00 |
| 2020/0062058 A1 * | 2/2020 | White ..................... B60B 39/00 |
| 2020/0398621 A1 * | 12/2020 | Landis ..................... B62J 50/00 |
| 2021/0221476 A1 * | 7/2021 | Szydlowski ............ B63B 25/12 |
| 2021/0252926 A1 * | 8/2021 | McCarthy ............... B60D 1/02 |
| 2021/0317602 A1 * | 10/2021 | Wang ................... D03D 15/292 |

* cited by examiner

*Primary Examiner* — Kevin Hurley
*Assistant Examiner* — Marlon A Arce
(74) *Attorney, Agent, or Firm* — Suzanne Kikel, Patent Agent

(57) ABSTRACT

A harness assembly for towing a vehicle having a sling-like configuration that encloses an end of a towed vehicle and which is connected to a towing vehicle by elongated straps. Elongated towing straps have a first looped end attached to the cover and a second looped end attached to the towing vehicle. First and second flexible straps extend through the first looped end of the towing straps for releasably connecting the cover to the towing straps. First and second rope networks are part of the cover and consist of a plurality of ropes which merge at their ends to form a cord member and a loop through which the flexible straps extend. The towing straps are flexible and have a length greater than the length of the towed vehicle. The towing straps; the flexible straps; and the cover are made of a strong, durable material.

7 Claims, 4 Drawing Sheets

HARNESS ASSEMBLY FOR TOWING A VEHICLE

BACKGROUND OF THE INVENTION

1. Field of the Invention

The present invention relates, in general, to the towing of vehicles, such as an automobile or SUV. More particularly, the invention relates to a harness assembly used on the rear or front of a towed vehicle and connected to a towing vehicle. The harness assembly is designed to decrease or lessen damage to the towed vehicle.

2. Brief Description of the Prior Art

A common way for pulling a car involves the attaching of a chain or a brace to the car's bumper or to its undercarriage and pulling therefrom. When the front or rear part of the car is not in condition for supporting itself due to some mechanical defect or to an accident, one end of the car must be raised by pulling upwardly on the bumper or on the undercarriage.

In the history of the automobile industry, there have been many developments in the area relating to the handling of disabled vehicles. Initially, a relatively simple chain and cable lift device was employed for lifting and towing disabled vehicles, with the primary concern being to accomplish the rescue operation without concern for the wreck or the wrecker, as such. However, as time passed and automobile design advanced, a point was reached at which auto bumpers, fenders, and grill designs became such that a wrecker might cause considerable damage to the vehicle during the rescue operation.

Present-day automobiles are being made with more delicate bumpers, some of which are split, and with exposed body panels, such as splash panels or under-panels; the result being that it is becoming more and more difficult to lift one end of the car without damaging the bumper or grill work. Therefore, when a car is disabled on a street from which it must be removed, with the present-day towing equipment, the damage done to a car when towing it in many instances is far greater compared to the costs involved in repairing the car in view of an accident, such as a collision.

Experience has demonstrated that the pulling action exerted on the bumper or the undercarriage can result in damaging other parts of the car. This may be due in view of the increased weight of the newer cars, their increased fragility, and/or their particular design.

In view of the current designs of automobiles, in many instances, it is no longer possible to lift these vehicles with a winch and cable with a hook at its end without damaging the vehicle.

Oftentimes, conventional towing devices lift and pull a vehicle by hooking a chain or sling to its bumper, axle, or undercarriage. Many of these conventional devices have proven to be inadequate for towing the newer vehicles having lightweight metal or plastic bodies which are easily damaged when pressure is exerted there against by the towing devices. Various attempts have been made to provide alternative towing methods.

An alternate type of device raises the car by supporting the front or rear wheels off the ground with a mechanism mainly engaging only the wheels. Several of these wheel-supporting devices are known in the towing industry. Some of these devices are constructed of relatively thick steel, such that the devices are relatively heavy. Such heavy weight is of concern to a tow truck operator because, if the load on the rear of his truck is too great, the front wheels of the truck will leave the ground and the truck may become inoperable or at best have poor driving control. This loading problem is accentuated when the main pivot of the unit is placed at the rear end of the tow truck so as to be spaced rearwardly of the rear axle and when the winch and boom of the tow truck are not utilized as lifting aids.

Some of the current-day conventional towing devices are complicated in structure and tend to be either bulky or unstable in design. Additional hydraulic devices are often required for the operation of the lift mechanisms associated therewith. Another problem associated with some of the current-day towing devices is that they interfere with or prohibit the alternate use of conventional towing devices, thereby lessening the versatility of the tow truck. Other devices are somewhat unstable in that they are free to swing from side-to-side and present a danger of loss of control of the towed vehicle.

Therefore, there is a need in the art for a towing mechanism which does not support or directly engage the bumper or body panels of the vehicle to be towed, but instead supports members of the towed vehicle which are not easily subject to damage.

There is a further need in the art for such a mechanism which is relatively light weight yet strong enough to support a towed vehicle; which takes advantage of leverage and principles to ease lifting; which is simple in design and easy to manufacture; which provides stability in towing; and which can be utilized in conjunction with existing, conventional towing devices and vehicles.

SUMMARY OF THE INVENTION

The present invention meets these needs. More particularly, the present invention provides a harness assembly for towing a vehicle with a front end, a rear end with an upper portion and a bottom portion, a first side extending between the front end and the rear end, a second side extending between the front end and the rear end, and a length measured between the front end and the rear end of the vehicle. The harness assembly comprises a cover for enclosing the rear end of the vehicle, and has an upper edge extending over the upper portion of the rear end of the vehicle. The cover extends from the first side of the vehicle to the second side of the vehicle, and has a lower edge extending adjacent to the lower portion of the vehicle between the first side of the vehicle and the second side of the vehicle.

The cover further includes a first side edge located adjacent to the first side of the vehicle and a second side edge located adjacent to the second side of the vehicle; a first towing strap extending adjacent to the first side of the vehicle and having a first looped end and second looped end, and having a length as measured between the first end and the second end of the first towing strap exceeding the length of the vehicle; and a second towing strap adjacent to the second side of the vehicle and having a first looped end and second looped end, and having a length measured between the first end and the second end of the second towing strap exceeding the length of the vehicle. A first flexible strap extends through the first looped end of the first towing strap for releasably connecting the cover to the first towing strap; and a second flexible strap extends through the first looped end of the second towing strap for releasably connecting the cover to the second towing strap. The second looped end of the first towing strap and the second looped end of the second towing strap being connected to towing elements of a towing vehicle for the towing process.

The cover also includes a first rope network consisting of a plurality of elongated rope members laced at their end through the cover and merging at their ends to form a first cord member and a first loop member connected to the first cord member, and wherein the first flexible strap extends through the first loop member of the first rope network for connection of the cover to the first towing strap; and a second rope network consisting of a plurality of elongated rope members laced at their end through the cover and merging at their ends to form a second cord member and a second loop member connected to the second cord member, and wherein the second flexible strap extends through the second loop member of the second rope network for connection of the cover to the second towing strap.

The length of the first towing strap and the length of the second towing strap is approximately 1 to 2 times the length of the towed vehicle and are flexible and made of nylon. The length of the first and second flexible straps ranges from 2 to 4 feet, and are made of a strong, durable material selected from the group of materials consisting of nylon and weft fabric. The cover is made of a strong, durable material selected from the group consisting of cotton, nylon and weft.

These and other features and advantages of the present invention will be better appreciated and understood when the following description is read in light of the accompany drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
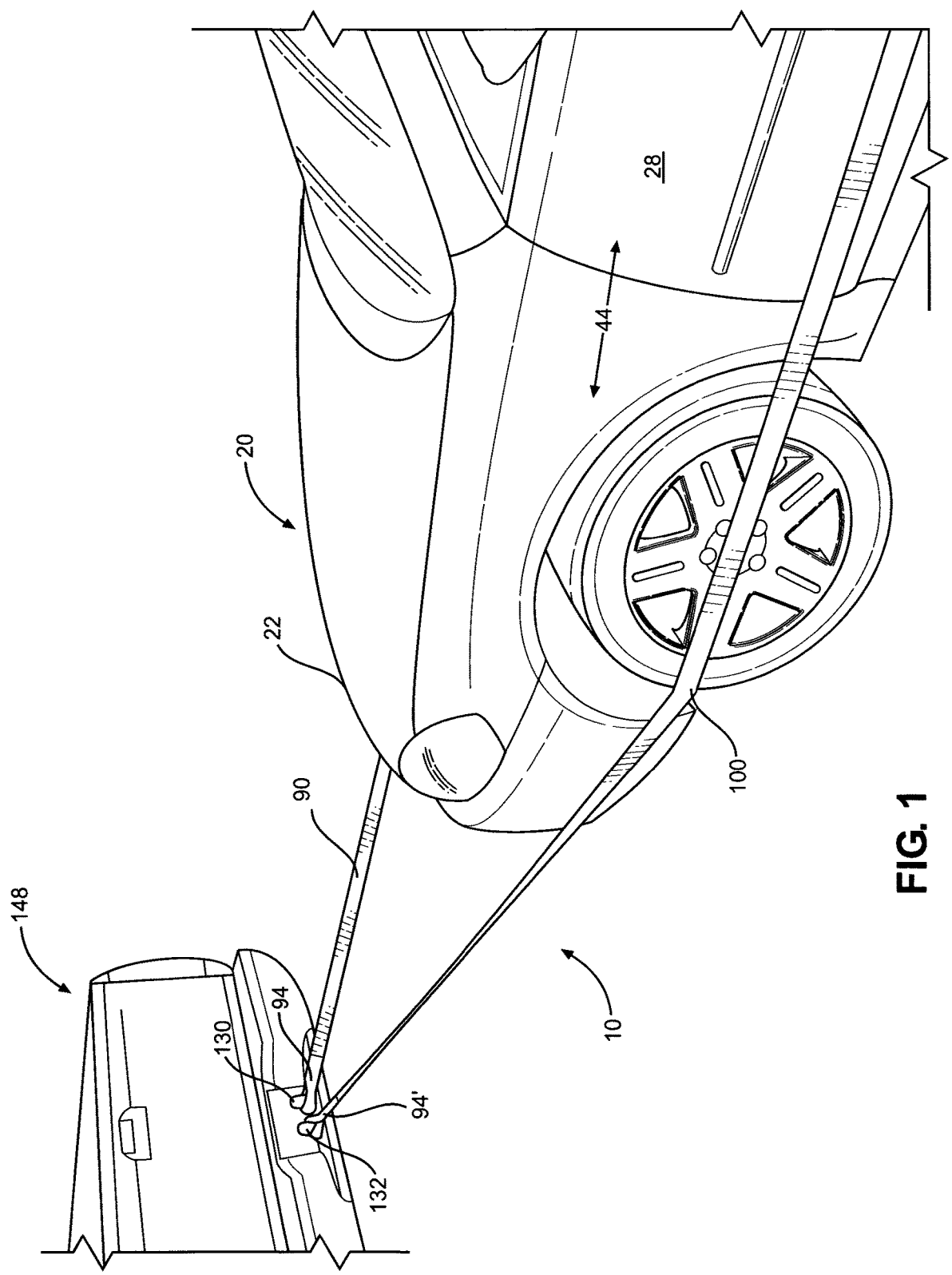
FIG. 1 is partial, side perspective view of a towed vehicle connected to a towing vehicle by use of the harness assembly of the present invention.

Referring to FIGS. 1 through 4, the present invention relates to a harness assembly 10 for towing a vehicle, such as an automobile, indicated in the figures by reference number 20. Vehicle 20 has a front end 22; a rear end 24; a first side 26 extending between the front end 22 and the rear end 24; and a second side 28 extending between the front end 22 and the rear end 24. The rear end 24 of vehicle 20 has an upper portion 40 and a lower portion 42 and has a length 44 measured between the front end 22 and the rear end 24 of the vehicle.

Figure 2:
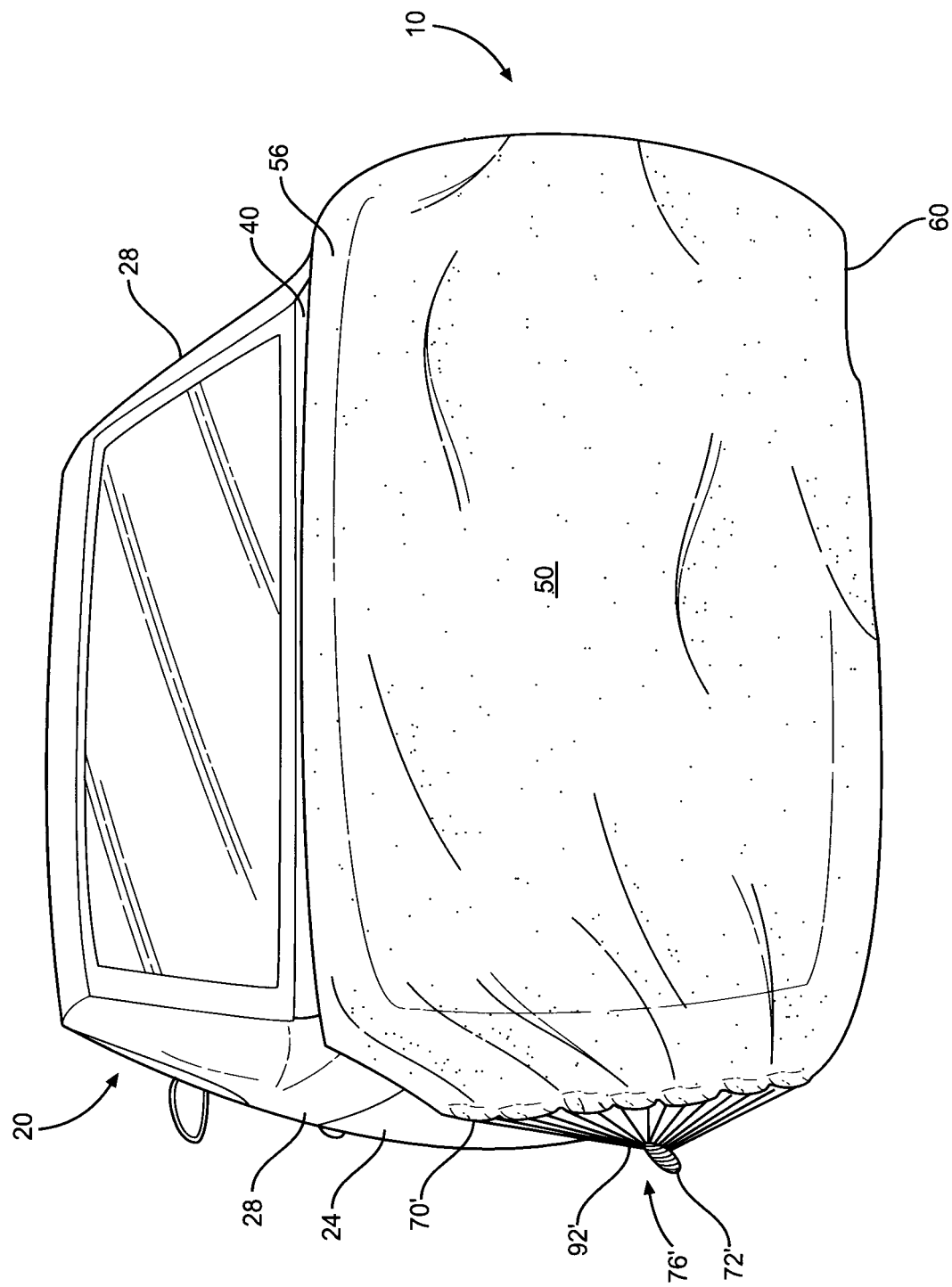
FIG. 2 is a rear perspective view of the towed vehicle with the harness assembly of the invention attached to the rear of the towed vehicle.

Referring particularly to FIG. 2, harness assembly 10 comprises a cover 50 which is a flexible, sling-type configuration and which is constructed to wrap substantially around the rear end 24 of vehicle 20 to enclose the rear end 24. Cover 50 has an upper edge 56 extending over the upper portion 40 of the rear end 24 of the vehicle and extending from the first side 26 to the second side 28 of vehicle 20.

Figure 3:
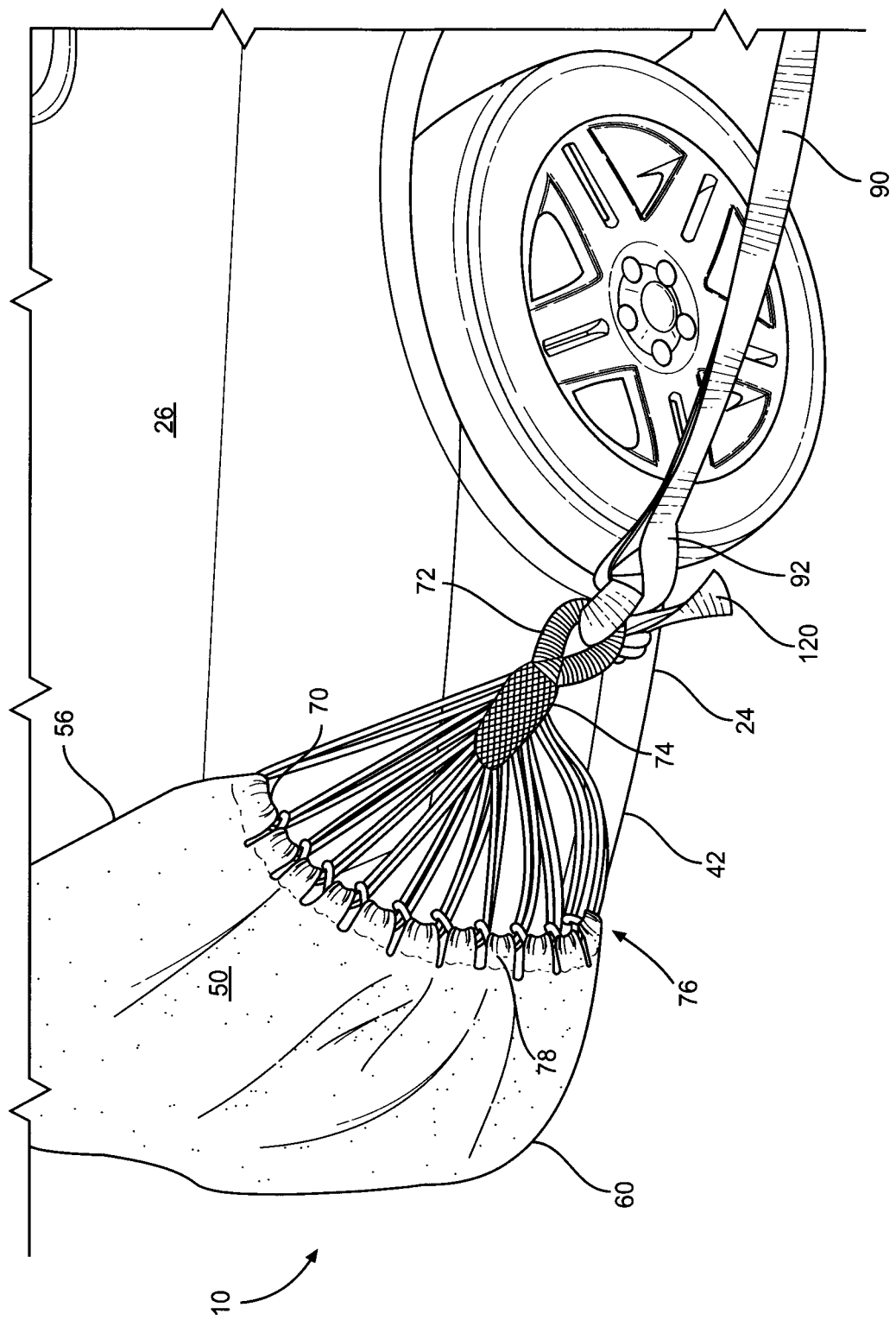
FIG. 3 is a partial, side perspective view of the towed vehicle of FIGS. 1 and 2 showing a first side of the harness assembly of the invention being attached to the rear of the towed vehicle and along a first side of the towed vehicle.
Figure 4:
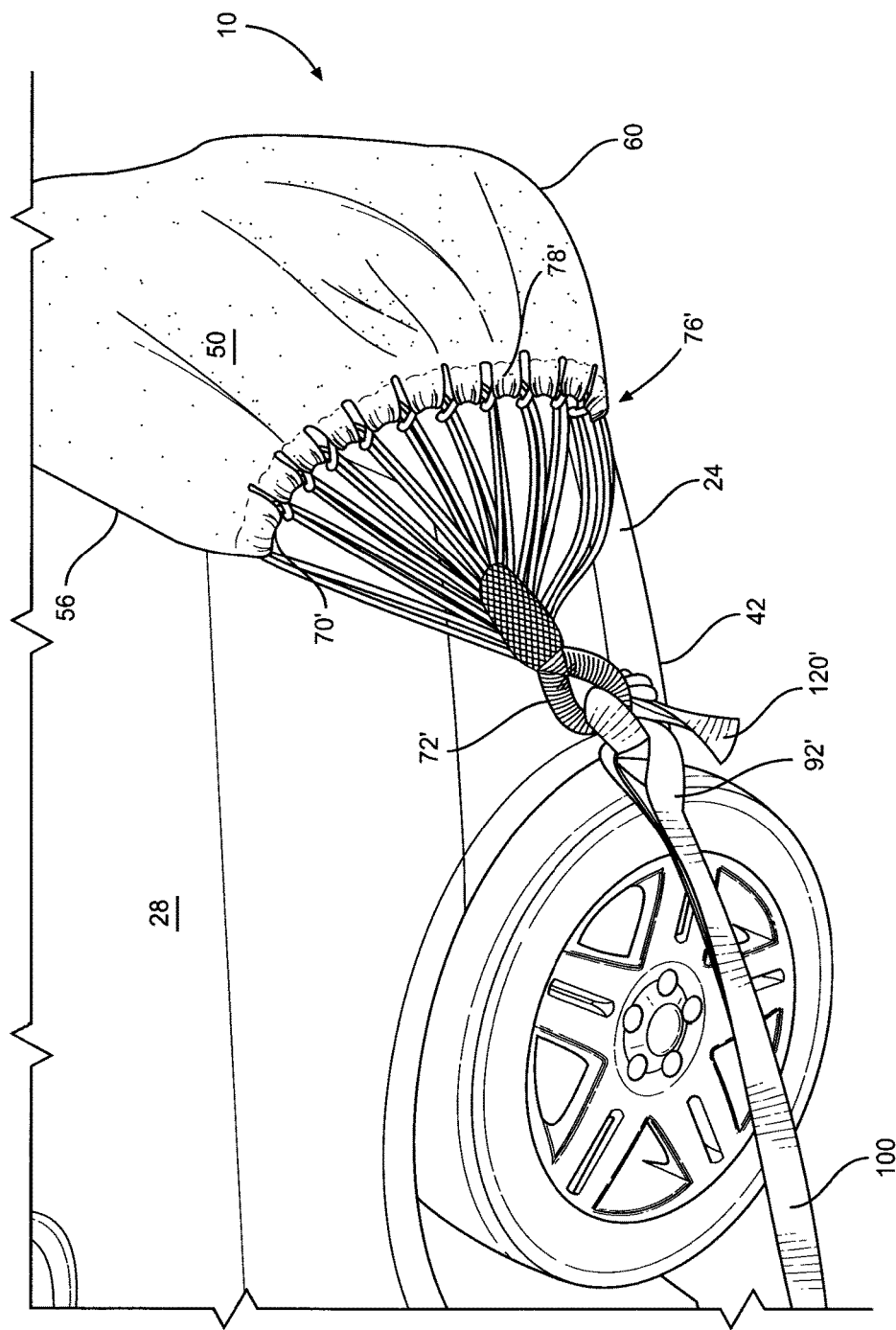
FIG. 4 is a partial, side perspective view of the towed vehicle of FIGS. 1 and 2 showing a second side of the harness assembly of the invention being attached to the rear of the towed vehicle and along a second side of the towed vehicle, it being noted that the second side of the harness assembly is a mirror image of the first side of the harness assembly shown in FIG. 3.

As particularly shown in FIG. 3, cover 50 has a lower portion 60 which when cover 50 is positioned over the rear end 24 of vehicle 20, lower portion 60 extends adjacent to the lower portion 42 of vehicle 20 between the first side 26 and the second side 28 of vehicle 20. As shown in FIG. 3, and as stated herein above, cover 50 is sized to fit substantially over the rear end 24 of vehicle to enclose the rear end for towing or dragging of vehicle 20, more about which is discussed herein below. It is to be appreciated that FIG. 3 illustrates a first side of harness assembly 10, and that FIG. 4 illustrates a second side of harness assembly, and that the components of the first side of harness assembly 10 (FIG. 3) is a mirror image of those of the second side thereof (FIG. 4). It is also to be appreciated that cover 50 extends between the first side and the second side of harness assembly 10 as particularly shown in FIG. 2.

Still referring to FIG. 3 and to the first side of harness assembly 10, cover 50 further includes a first side edge 70 located adjacent to the first side 26 of vehicle 20 and extending down along the rear end 24 and terminating adjacent to lower portion 42 of rear end 24 of vehicle 20. With reference to FIG. 4, cover 50 further includes a second side edge 70' located adjacent to the second side 28 of vehicle 20 and extending down along the rear end 24 and terminating adjacent to lower portion 42 of rear end 24 of vehicle 20.

As stated herein above, the components on the first side of harness assembly 10 of FIG. 3 are identical to those on the second side shown in FIG. 4; and that the first side of harness assembly 10 is illustrated in FIG. 3 and the second side of harness assembly 10 is illustrated in FIG. 4.

Referring to FIGS. 1 and 3, harness assembly 10 further comprises a first towing strap 90 located adjacent to the first side 26 of vehicle 20. As particularly shown in FIG. 3, first towing strap 90 has a first looped end 92 spaced away from a first loop member 72 of cover 50 and a second looped end 94 which in FIG. 1 is attached to the rear end 24 of towing vehicle 148. As is apparent from FIG. 1, first towing strap 90 has a length which is greater than the length of vehicle 20.

Referring particularly to FIGS. 1 and 4, harness assembly 10 further comprises a second towing strap 100 which as shown in FIG. 4 is located adjacent to the second side 28 of vehicle 20. Second towing strap 100 is identical to first towing strap 90. As best shown in FIG. 4, second towing strap 100 has a first looped end 92' spaced away from a second loop member 72' of cover 50 and a second looped end 94' (FIG. 1) attached through suitable means to the rear end of towing vehicle 148. As is apparent from FIG. 1, second towing strap 100 has a length greater than the length of vehicle 20.

The length of first towing strap 90 and second towing strap 100 are greater than the length of vehicle 20 so that vehicle 20 can be towed safety by towing vehicle 148 and so that towing vehicle 148 is positioned far enough in front of vehicle 20 when vehicle 20 is being towed; and wherein damage to towed vehicle 20 and the towing vehicle 148 is eliminated or lessened. Also, the length of first towing strap 90 and second towing strap 100 are about equal to each other so that vehicle 20 can be pulled symmetrically and evenly along the road and/or ground. In an embodiment of the invention, the length of first towing strap 90 and second towing strap 100 may range from about 1½ to about 2 times the length of vehicle 20. It is to be further appreciated that first towing strap 90 and second towing strap 100 are made of a strong, durable material, such as nylon or weft, and that the material is flexible such that first and second towing straps 90, 100 can be folded and/or layered upon itself for storage purposes of harness assembly 10. Weft is generally known as being an article of woven fabric which inherently has strength and durability.

Referring again to FIGS. 3 and 4, harness assembly 10 further comprises a first rope network 76 on the first side of harness assembly 10 (FIG. 3) and a second rope network 76' on the second side of harness assembly 10 (FIG. 4). As shown in FIGS. 3 and 4, first rope network 76 and second rope network 76' each consists of a plurality of elongated rope members which are laced at their one end through cover 50 near the first side edge 70 and the second side edge 70' of cover 50. It is to be appreciated that during the manufacturing process of harness assembly 10, the elongated rope members are laced around a rigid rib member which is embedded in cover 50 and indicated in FIGS. 3 and 4 at reference number 78, 78', respectively.

Referring to FIG. 3, the elongated rope members of the first rope network 76 are connected to and extend from cover 50 and merge at their ends to form first cord member 74 and first loop member 72 which is connected to first cord member 74. Referring to FIG. 4, the elongated rope members of the second rope network 76' are connected to and extend from cover 50 and merge at their ends to form a second cord member 74' and second loop member 72' which is connected to second cord member 74'.

Referring to FIG. 3, harness assembly 10 further comprises a first flexible strap 120 for releasably securing first loop member 72 to elongated towing strap 90; and as shown in FIG. 4, harness assembly 10 further comprises a second flexible strap 120' for releasably securing second loop member 72' to elongated towing strap 100. First flexible strap 120 and second flexible strap 120' are relatively short compared to first towing strap 90 and second towing strap 100. In an embodiment of the invention, the length of first flexible strap 120 and second flexible strap 120' may range from 2 to 4 feet. As shown in FIG. 3, first flexible strap 120 is easily threaded through first loop member 72 and through first looped end 92 of first towing strap 90, and in a well-known manner such that the ends of first flexible strap 120 are tied together to securely attach first towing strap 90 to cover 50.

As shown in FIG. 4, second flexible strap 120' is easily threaded through second loop member 72' and through second looped end 92' of second towing strap 100, and in a well-known manner such that the ends of second flexible strap 120' are tied together to securely attach second towing strap 100 to cover 50. First and second flexible straps 120, 120' are made of a strong, durable material, which may be selected from the group of materials consisting of nylon and weft fabric.

Straps 120, 120' are flexible such that they can be folded upon themselves for easy storage. Cover 50 preferably is made of a strong, durable, and flexible material and may be selected from the group consisting of cotton, nylon, and weft material. Cover 50 may be a flexible band extending across the rear of the vehicle. It is to be appreciated that cover 50 can be folded upon itself for easy handling and/or storage, and/or separated from straps 90, 100, 120, or 120' for easy handling and/or storage of harness assembly 10.

With particular reference to FIG. 1, first towing strap 90 of harness assembly 10 has a looped end 94 which is mounted around a first elongated upright member 130 of towing vehicle 148; and second towing strap 100 has a looped end 94' mounted around a second elongated upright member 132 of towing vehicle 148 for towing vehicle 20 by using the harness assembly 10 of the invention.

Even though harness assembly 10 is described herein above as enclosing the rear 24 of vehicle 20, it can be appreciated that harness assembly may also be positioned around the front of vehicle 20 when vehicle 20 is turned around 180 degrees so that harness assembly 10 can be used to pull vehicle 20 effectively by its front end. It is also be appreciated that cover 50; first and second towing straps 90, 100; and first and second flexible straps 120, 120' can be separated and stored as separate entities, or they can be connected to each other and stored as a unite for storage purposes.

In using harness assembly 10, cover 50 is arranged around the rear end 24 of vehicle 20; first towing strap 90 via flexible strap 120 is secured to cover 50; second towing strap 100 via flexible strap 120' is secured to cover 50; and first towing strap 90 and second towing strap 100 are secured around elongated upright members 130, 132 of towing vehicle 148 as described herein above and vehicle 20 is towed by vehicle 148. It is to be further appreciated that first and second towing straps 90 and 100 may also take other elongated forms instead of elongated straps. Also, flexible straps 120 and 120' may also be other forms for connecting the towing straps to the cover. For example, other types of loop fasteners available in the market place, such as metal loops, may be used instead of flexible straps 120 and 120'.

While the present invention has been described in connection with the preferred embodiments of the figures, it is to be appreciated and understood that other similar embodiments may be used or modifications and additions may be made to the described embodiments for performing the same function of the present invention without deviating therefrom. Accordingly, it is intended by the appended claims to cover all such changes and modifications as come with the spirit and scope of the invention.

What is claimed is:

1. A harness assembly for towing a vehicle having a front end, a rear end with an upper portion and a bottom portion, a first side extending between the front end and the rear end, a second side extending between the front end and the rear end, and a length measured between the front end and the rear end of the vehicle; the harness assembly, comprising;

a cover for enclosing the rear end of the vehicle, the cover having an upper edge extending over the upper portion of the rear end of the vehicle and extending from the first side of the vehicle to the second side of the vehicle, and a lower edge extending adjacent to the lower portion of the vehicle between the first side of the vehicle and the second side of the vehicle, the cover further including a first side edge located adjacent to the first side of the vehicle and a second side edge located adjacent to the second side of the vehicle;

a first towing strap extending adjacent to the first side of the vehicle and having a first looped end and second looped end, and having a length as measured between the first end and the second end of the first towing strap exceeding the length of the vehicle;

a second towing strap adjacent to the second side of the vehicle and having a first looped end and second looped end, and having a length measured between the first end and the second end of the second towing strap exceeding the length of the vehicle;

a first flexible strap extending through the first looped end of the first towing strap for releasably connecting the cover to the first towing strap; and a second flexible strap extending through the first looped end of the second towing strap for releasably connecting the cover to the second towing strap, the second looped end of the first towing strap and the second looped end of the second towing strap being connected to towing elements of a towing vehicle for the towing process.

2. The harness assembly of claim 1, wherein the cover further comprises:

a first rope network consisting of a plurality of elongated rope members laced at their end through the cover and merging at their ends to form a first cord member and a first loop member connected to the first cord member, and wherein the first flexible strap extends through the first loop member of the first rope network for connection of the cover to the first towing strap; and a second rope network consisting of a plurality of elongated rope members laced at their end through the cover and merging at their ends to form a second cord member and a second loop member connected to the second cord member, and wherein the second flexible strap extends through the second loop member of the second rope network for connection of the cover to the second towing strap.

3. The harness assembly of claim 1, wherein the length of the first towing strap and the length of the second towing strap is approximately 1 to 2 times greater than the length of the towed vehicle.

4. The harness assembly of claim 1, wherein the first towing strap and the second towing strap are flexible and are made of nylon.

5. The harness assembly of claim 1, wherein the length of the first flexible strap and the second flexible strap ranges from about 2 to 4 feet, and are made of a strong, durable material selected from the group of materials consisting of nylon and weft fabric.

6. The harness assembly of claim 1, wherein the cover is made of a strong, durable material selected from the group of materials consisting of cotton, nylon and weft.

7. The harness assembly of claim 1, wherein the cover is a sling-like configuration.

* * * * *